US008644219B2

(12) United States Patent
Nishizaka (10) Patent No.: US 8,644,219 B2
(45) Date of Patent: Feb. 4, 2014

(54) COMMUNICATION REPEATER AND COMMUNICATION SYSTEM

(75) Inventor: Naoki Nishizaka, Yokohama (JP)

(73) Assignee: Kyocera Corporation, Kyoto (JP)

( * ) Notice: Subject to any disclaimer, the term of this patent is extended or adjusted under 35 U.S.C. 154(b) by 358 days.

(21) Appl. No.: 13/074,671

(22) Filed: Mar. 29, 2011

(65) Prior Publication Data

US 2011/0235536 A1    Sep. 29, 2011

(30) Foreign Application Priority Data

Mar. 29, 2010 (JP) .................. 2010-076294

(51) Int. Cl.
*H04W 4/00* (2009.01)
(52) U.S. Cl.
USPC ........................................ 370/328
(58) Field of Classification Search
None
See application file for complete search history.

(56) References Cited

U.S. PATENT DOCUMENTS

| 2004/0264501 | A1* | 12/2004 | Zalitzky et al. | 370/468 |
| 2006/0077906 | A1* | 4/2006 | Maegawa et al. | 370/254 |
| 2006/0221995 | A1* | 10/2006 | Berkman | 370/463 |
| 2006/0291483 | A1* | 12/2006 | Sela | 370/401 |
| 2008/0312851 | A1* | 12/2008 | Kagan et al. | 702/60 |
| 2009/0187285 | A1* | 7/2009 | Yaney et al. | 700/292 |
| 2010/0073193 | A1* | 3/2010 | Flammer, III | 340/870.11 |
| 2011/0221603 | A1* | 9/2011 | Deaver et al. | 340/660 |

FOREIGN PATENT DOCUMENTS

JP        2003169004 A        6/2003

* cited by examiner

*Primary Examiner* — Anh-Vu Ly
(74) *Attorney, Agent, or Firm* — Lowe Hauptman & Ham, LLP (57) ABSTRACT

A communication repeater comprises a transmitting and receiving that performs wireless communication with a communication device, a power-line carrier communication unit that performs power-line carrier communication with the communication device, and a control unit. The control unit selects either one of the wireless communication and the power-line carrier communication according to conditions.

7 Claims, 5 Drawing Sheets

COMMUNICATION REPEATER AND COMMUNICATION SYSTEM

CROSS-REFERENCE TO RELATED APPLICATION

The present application claims priority under 35 U.S.C. §119 to Japanese Patent Application No. 2010-076294, filed on Mar. 29, 2010. The content of which is incorporated by reference herein in its entirety.

BACKGROUND OF THE INVENTION

1. Field of the Invention

The present invention relates to a communication repeater that wirelessly transmits and receives a communication signal.

2. Description of the Related Art

A mobile communication device such as a mobile phone and Personal Handy-phone System (PHS) performs communication with other communication devices by receiving a communication signal output from a base station directly or via a communication repeater. As for a method of communication performed by a mobile communication device, performing communication with power-line carrier communication is proposed (see, for example, Japanese Patent Application Publication Laid-Open No. 2003-169004).

The communication repeater can perform communication with communication devices within a certain area by wirelessly transmitting and receiving a communication signal. However, even if the physical distance is close, there may be areas with which the communication repeater cannot perform communication, for example, the underground of a building where there are many objects (such as walls and floors) that block or attenuate a communication wave.

Japanese Patent Application Publication Laid-Open No. 2003-169004 describes how a mobile communication device performs power-line carrier communication by using a charging stand, but fails to describe any apparatus that is caused to transmit a communication signal of the power-line carrier communication. Moreover, a communication signal superimposed on a power line cannot maintain its signal components after passing through a substation directly. Thus, it becomes necessary to install facilities such as providing equipment to bypass a communication signal for each substation to ensure communication in a wider area with power-line carrier communication.

SUMMARY OF THE INVENTION

According to an aspect of the present invention, a communication repeater, having: a transmitting and receiving unit that transmits and receives a communication signal to/from a communication device with wireless communication; a power supply unit connected to a power line; a power-line carrier communication unit that transmits and receives a communication signal superimposed on a carrier transmitted over the power line from/to the communication device; and a control unit that controls wireless communication of the transmitting and receiving unit with the communication device and power-line carrier communication of the power-line carrier communication unit with the communication device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The present invention will be described in detail below with reference to drawings. The present invention is not restricted the following description. Elements in the description that follows contain elements a person skilled in the art can easily assume or substantially the same elements, that is, elements in the scope of so-called equivalents.

Figure 1:
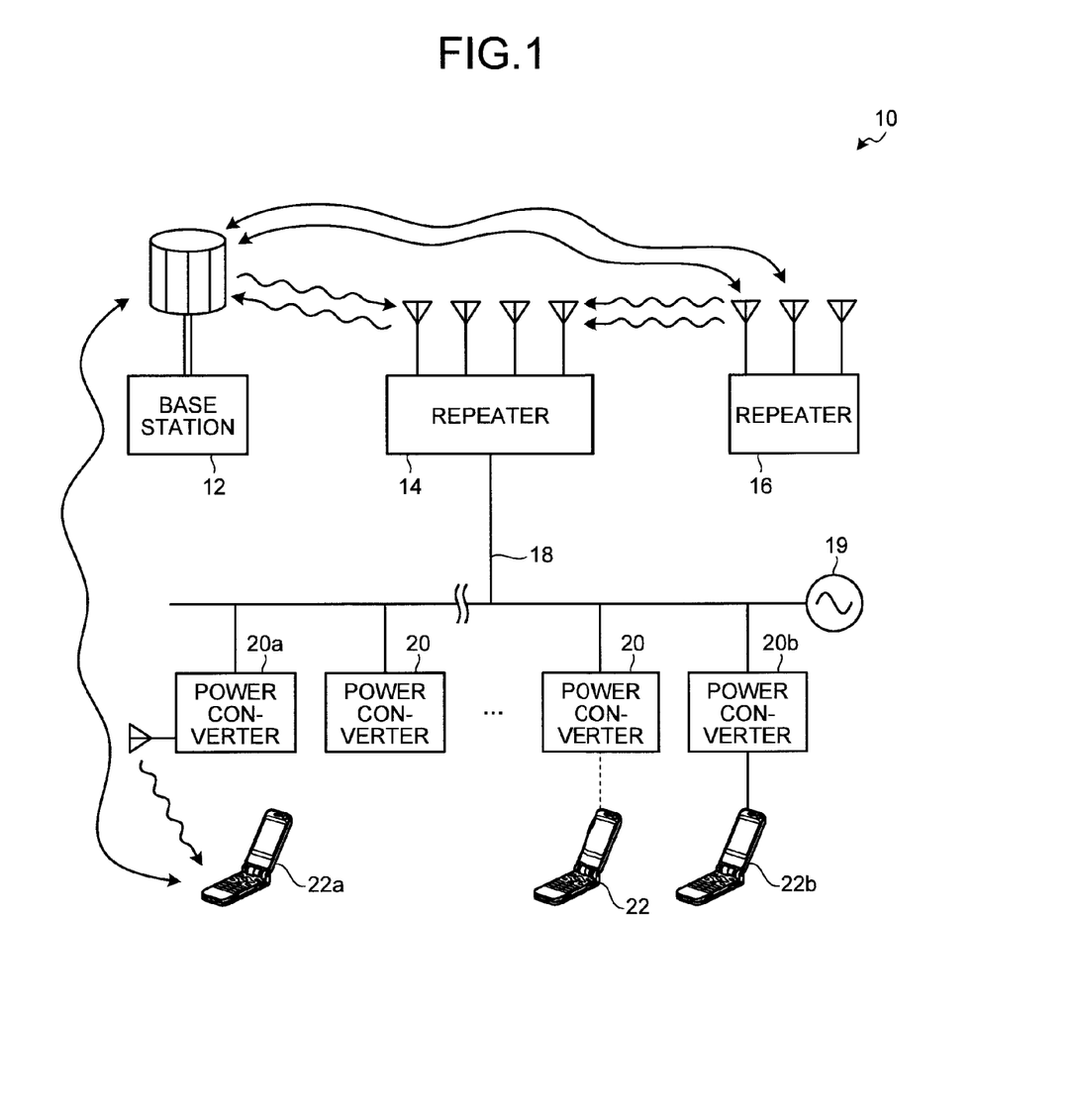
FIG. 1 is a schematic block diagram of an example of communication system having a communication repeater according to an embodiment of the present invention.

FIG. 1 is a schematic block diagram of an example of a communication system having a communication repeater according to an embodiment of the present invention. A communication system 10 includes a base station 12, communication repeaters (hereinafter, called "repeaters") 14 and 16, a power line 18, a commercial power supply 19, power converters 20, 20a, and 20b, and mobile communication devices 22, 22a, and 22b. While FIG. 1 illustrates only one base station 12 and the repeaters 14 and 16, a host of the base stations 12 and the repeaters 14 and 16 may be arranged in a communication network. Also, a host of the power converters 20, 20a, and 20b, and the mobile communication devices 22, 22a, and 22b may be arranged.

The base station 12 is a communication apparatus that wirelessly transmits and receives a communication signal to/from the mobile communication devices 22, 22a, and 22b and the repeaters 14 and 16. The base station 12 is also connected to the other base stations 12 (not illustrated) by wire or by wireless medium and transmits and receives a communication signal to/from the other base stations 12. The communication system 10 forms a communication network by transmitting and receiving a communication signal among base stations. The communication signal is a signal of data transmitted or received for a phone call, mail, or Internet communication.

The base station 12 can also communicate with (transmit and receive a communication signal to/from) other communication device apparatuses in another communication network, for example, in a communication network of another carrier by connecting a portion of the communication network including the base station 12 to an exchange.

Figure 2:
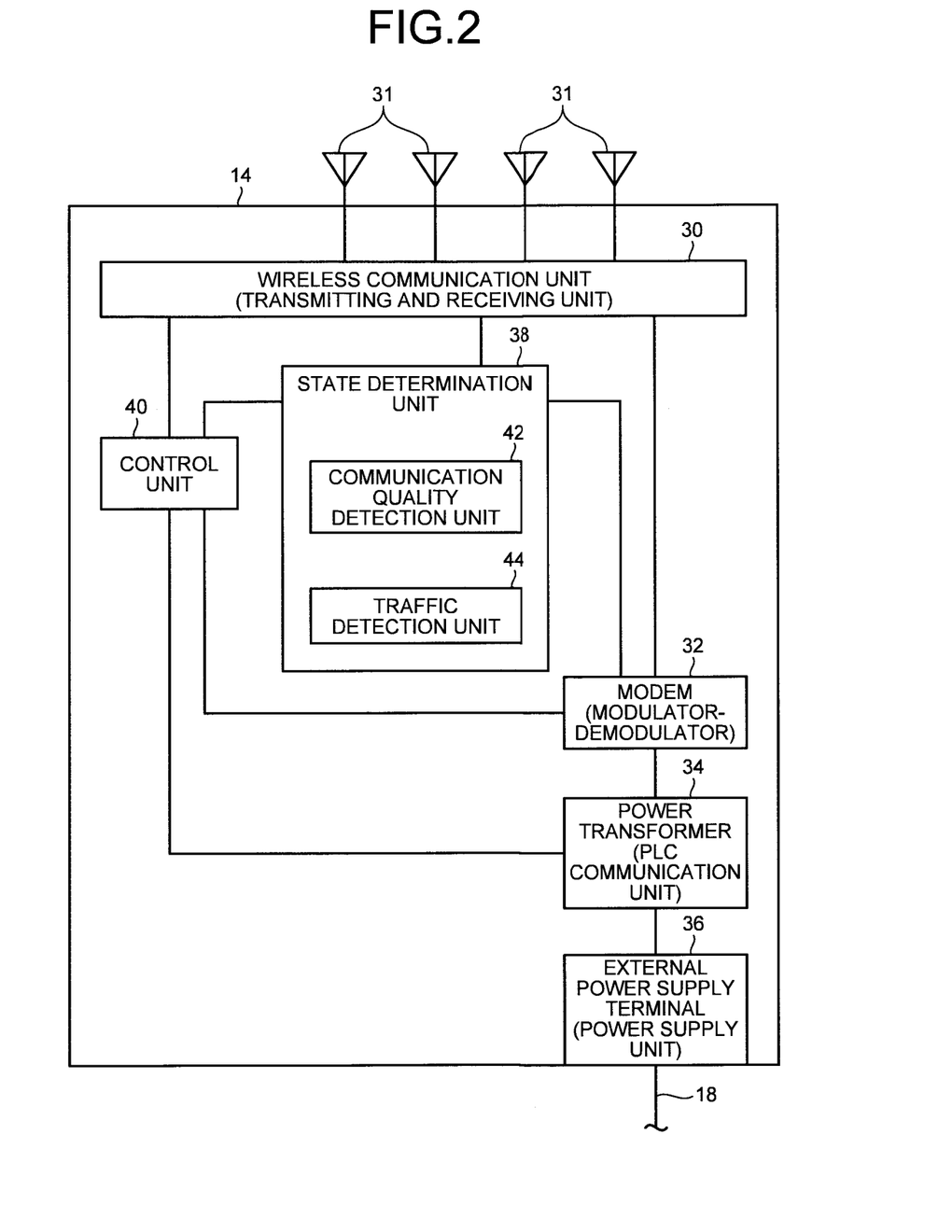
FIG. 2 is a schematic block diagram of the communication repeater illustrated in FIG. 1.

The repeaters 14 and 16 are wireless relay stations that wirelessly transmit and receive a communication signal to/from the corresponding base station 12. The repeater 14 and the repeater 16 have the same configuration with only a difference of installation location. Thus, hereinafter, the repeater 14 will representatively be described. FIG. 2 is a schematic block diagram of the communication repeater illustrated in FIG. 1.

The repeater 14 is a communication apparatus capable of transmitting and receiving a communication signal with wireless communication and transmitting and receiving a communication signal with power-line carrier communication. The repeater 14 includes, as illustrated in FIG. 2, a wireless communication unit 30, an antenna 31, a modem (modulator and demodulator) 32, a power transformer 34, an external power supply device (power supply unit) 36, a state determination unit 38, and a control unit 40.

The power-line carrier communication is also called Power Line Communication (PLC), Power Line Telecommunication (PLT), or power line communication. The power-line carrier communication is a technology to use power wiring installed in homes or offices as communication lines of full duplex communication having a bus network configuration. In the power-line carrier communication, a modulation method such as the orthogonal frequency domain multiplex (OFDM) using fast Fourier transforms or wavelet transforms, the spread spectrum (SS) techique capable of alleviating the reduction in speed due to an influence of noise, or the discrete multi-frequency (DMT method) can be adopted.

The wireless communication unit 30 performs wireless communication with the base station 12, the wireless communication unit of another repeater, or a mobile communication device via the antenna 31. The wireless communication unit 30 enables communication between the base station 12 and a mobile communication device by transmitting a communication signal transmitted from the base station 12 to the mobile communication device and transmitting a communication signal transmitted from the mobile communication device to the base station 12. That is, the wireless communication unit 30 and the antenna 31 wireless relay communication signals transmitted between the base station 12 and the mobile communication device. The wireless communication unit 30 performs, for example, wireless communication by time-division multiplexing or the like. The wireless communication by time-division multiplexing performs communication by obtaining a plurality of time slots by time division of a frame in the base station 12 and by assigning each of the slots obtained to a channel of the mobile communication device or the like. The wireless communication unit 30 also relays communication signals transmitted between the base station 12 and the wireless communication unit of another repeater via the antenna 31 wirelessly.

The wireless communication unit 30 further transmits a communication signal transmitted from the base station 12 or the wireless communication unit of another repeater and received with wireless communication via the antenna 31 to the modem 32. The wireless communication unit 30 transmits a communication signal transmitted from the modem 32 to the base station 12 or the wireless communication unit of another repeater with wireless communication via the antenna 31.

The modem 32 is a modulator-demodulator that converts the communication method of a communication signal. The modem 32 modulates a communication signal transmitted from the wireless communication unit 30 into a communication signal used for power-line carrier communication. Then the modem 32 transmits the modulated communication signal to the power line 18 (power-line carrier communication network) from the power transformer 34. The model 32 also demodulates a communication signal superimposed onto a carrier of power (power waveform) fed to the power transformer 34 via the external power supply device 36 from the power line 18 (power-line carrier communication network) into a communication signal used for wireless communication.

The power transformer (power-line carrier communication unit) 34 is connected to the power line 18 installed in homes or offices via the external power supply device 36. The power transformer 34 receives power fed from the commercial power supply 19 (described later) connected to the power line 18, and transforms the received power into power that can be used by the repeater 14. The power transformer 34 feeds the transformed power to each unit via the control unit 40. The power transformer 34 also transmits a communication signal superimposed on a power waveform of the power line 18 to the modem 32. The power transformer 34 superimposes a communication signal transmitted from the modem 32 on a power waveform and supplies the superimposed communication signal to the power line 18.

The external power supply device 36 is a device connected to the power line 18. The external power supply device 36 is, for example, an outlet.

The state determination unit 38 includes a communication quality detection unit 42 that detects a communication quality value indicating quality of a communication signal and a traffic detection unit 44 that detects a traffic (communication traffic) amount of a communication signal. More specifically, the state determination unit 38 measures quality of communication with wireless communication and quality of communication with power-line carrier communication through the communication quality detection unit 42. The communication quality detection unit 42 determines communication quality of a measurement target based on, for example, the Received Signal Strength Indicator (RSSI) indicating the signal strength, the minimum data transfer rate Committed Information Rate (CIR) guaranteed for each fixed connection party by the frame relay, the Carrier to Interference and Noise Ratio (CINR) indicating a carrier power to interference and noise power ratio, the signal power value, the signal power value by High Pass Filter (HPF) or Band Pass Filter (BPF), or the communication speed. The state determination unit 38 also measures the amount of traffic in each communication based on the number of lines or the amount of communication signal processed by the modem 32 and the wireless communication unit 30 through the traffic detection unit 44.

The control unit 40 comprises a semiconductor integrated circuit including a central processing unit (CPU) and a storage unit in which data and programs necessary for processing are stored. The control unit 40 manages and controls the whole repeater 14 based on programs and data stored in the storage unit and states of the state determination unit 38, the wireless communication unit 30, and the modem 32.

The repeater 14 is configured as described above and uses the wireless communication unit 30 to transmit and receive a communication signal to/from the base station 12, the wireless communication unit of another repeater, or a mobile communication device with wireless communication. The repeater 14 also uses the modem 32 and the power transformer 34 to transmit and receive a communication signal via the power line 18 with power-line carrier communication.

Returning to FIG. 1, the description of the communication system 10 will continue. The power line 18 is a path to transfer power. The power line 18 is connected to the repeater 14 or an external power supply device (outlet) provided in buildings, offices, and homes. The power line 18 feeds power fed from the commercial power supply 19 to each device via the external power supply device. The power line 18 transmits a carrier on which a communication signal superimposed.

The commercial power supply 19 is a transformation unit, that is, an apparatus that feeds power generated by a power station or the like to the power line 18. The commercial power supply 19 feeds power to the power line 18.

The power converters 20, 20a, and 20b are devices connected to the power line 18. The power converters 20, 20a, and 20b have a function similar to that of the modem 32 and the power transformer 34 of the repeater 14. The power converters 20, 20a, and 20b have the common basic configuration. Thus, hereinafter, the power converter 20 will representatively be described. The power converter 20 converts a carrier-superimposed communication signal supplied from the power line 18 into a communication signal that can be received by a mobile communication device and transmits the converted communication signal to the mobile communication device. The method of transmitting a communication signal from the power converter 20 to the mobile communication device is not particularly limited. The power converter 20 also converts a communication signal transmitted from the mobile communication device into a communication signal used for power-line carrier communication. The power converter 20 may include a function to charge the mobile communication device by feeding power to the mobile communication device fed from the power line 18.

Communication between the power converters 20, 20a, and 20b and the mobile communication devices 22, 22a, and 22b will be described below. The power converter 20a has an antenna. The power converter 20a transmits and receives a communication signal to/from the mobile communication device 22a with wireless communication. In this case, the power converter 20a converts a carrier-superimposed communication signal supplied from the power line 18 into a communication signal of wireless communication. As for a method of wireless communication, for example, a method similar to the method of wireless communication performed between the base station 12 and the mobile communication device may be used. In this case, the mobile communication device can perform communication by using the function to perform communication with the base station 12. The power converter may also perform wireless communication through infra-red communication or short-distance communication such as Bluetooth.

The power converter 20b is connected to the mobile communication device 22b via a power line. The power converter 20b transmits and receives a communication signal to/from the mobile communication device 22b with wire communication. In this case, the power converter 20b may also perform communication with power-line carrier communication or may perform communication with a dedicated wire communication line.

The mobile communication devices 22, 22a, and 22b are devices that transmit and receive a communication signal to/from the base station 12 through various paths described above. The mobile communication devices 22, 22a, and 22b converts a received communication signal into a voice, character string, or image for output to a receiver, speaker, display unit or the line. The mobile communication devices 22, 22a, and 22b also convert an input voice, character information, or image into a communication signal for output to the base station 12. The mobile communication device 22, 22a, and 22b enables a phone call, a mail communication, or an access for a Web site by transmitting and receiving a communication signal to/from other communication devices via the base station 12, the repeaters 14 and 16 or the like. As the mobile communication device, a mobile phone, Personal Handyphone System (PHS), PDA, portable navigation apparatus, portable game machine or the like can be used.

Figure 3:
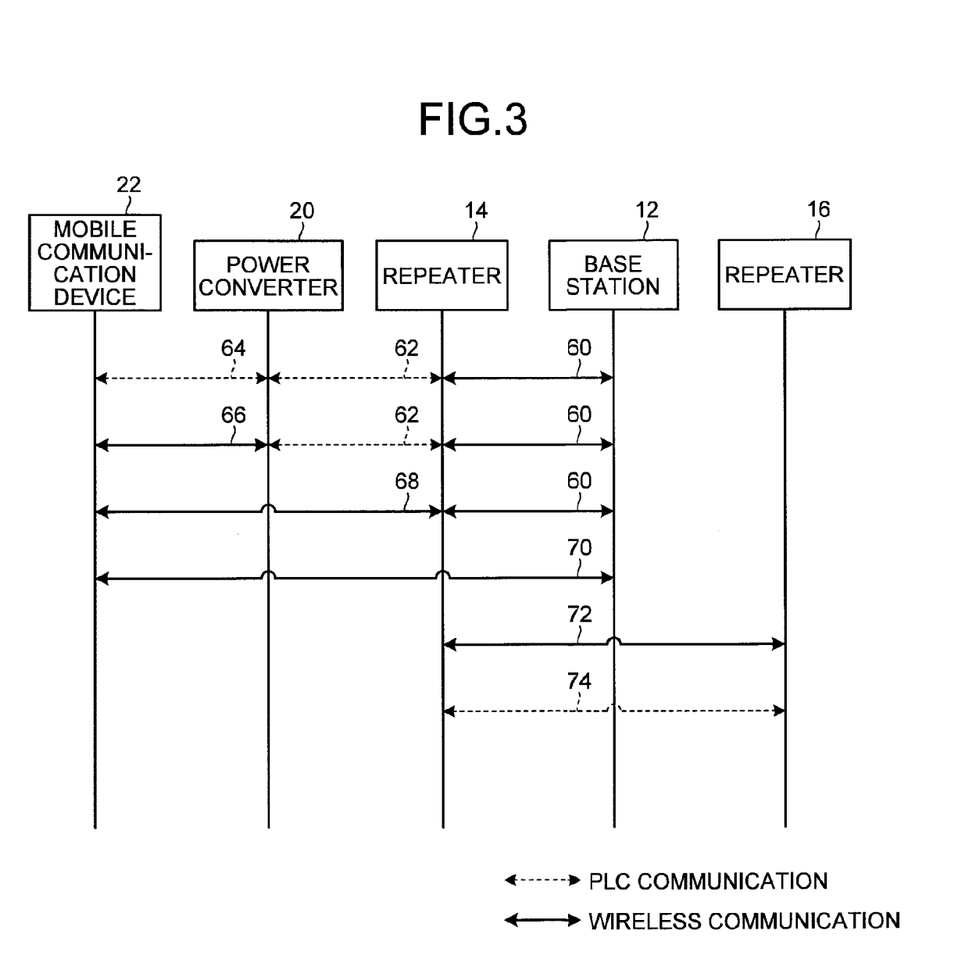
FIG. 3 is a diagram for explaining communication paths of the communication system illustrated in FIG. 1.

Next, communication paths of the communication system 10 will be described using FIG. 3. FIG. 3 is a diagram for explaining communication paths of the communication system illustrated in FIG. 1. As illustrated in FIG. 3, the communication system 10 can connect the base station 12 and the mobile communication device 22 by four communication paths. That is, the communication system 10 can put the base station 12 and the mobile communication device 22 into a state ready to transmit and receive a communication signal by four communication paths.

The communication system 10 has, as a first path, a path to transmit and receive a communication signal between the base station 12 and the mobile communication device 22 on which the base station 12 and the repeater 14 perform communication with wireless communication 60, the repeater 14 and the power converter 20 perform communication with power-line carrier communication 62, and further the power converter 20 and the mobile communication device 22 perform communication with power-line carrier communication 64. The communication system 10 has, as a second path, a path to transmit and receive a communication signal between the base station 12 and the mobile communication device 22 on which the base station 12 and the repeater 14 perform communication with the wireless communication 60, the repeater 14 and the power converter 20 perform communication with the power-line carrier communication 62, and further the power converter 20 and the mobile communication device 22 perform communication with wireless communication 66. The communication system 10 has, as a third path, a path to transmit and receive a communication signal between the base station 12 and the mobile communication device 22 on which the base station 12 and the repeater 14 perform communication with the wireless communication 60 and the repeater 14 and the mobile communication device 22 perform communication with wireless communication 68. The communication system 10 has, as a fourth path, a path to transmit and receive a communication signal between the base station 12 and the mobile communication device 22 on which the base station 12 and the mobile communication device 22 perform communication with wireless communication 70.

The communication system 10 can also connect the repeater 14 and the repeater 16 by two communication paths. That is, the communication system 10 can put the repeater 14 and the repeater 16 into a state ready to transmit and receive a communication signal by two communication paths. More specifically, the communication system 10 has a path on which the repeater 14 and the repeater 16 transmit and receive a communication signal by performing wireless communication 72 between the repeater 14 and the repeater 16. The communication system 10 has another path on which the repeater 14 and the repeater 16 transmit and receive a communication signal by performing power-line carrier communication 74 between the repeater 14 and the repeater 16.

Figure 4:
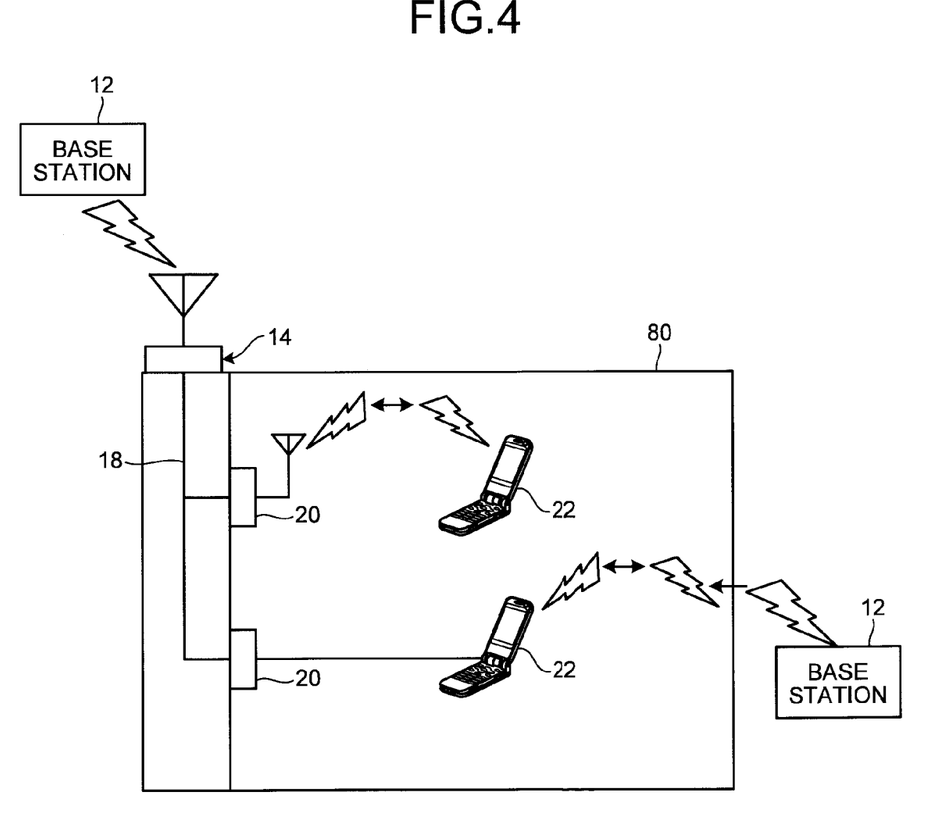
FIG. 4 is a diagram for explaining an operation of the communication system.

By providing the repeater 14 capable of communicating with the mobile communication device 22 with the power-line carrier communication 62, as illustrated in FIG. 4, the communication system 10 enables communication between the repeater 14 and the mobile communication device 22 without using the wireless communication. FIG. 4 is a diagram for explaining the operation of the communication system. By providing the repeater 14 outside a building 80 and the power converter 20, which is an output unit for power-line carrier communication, inside the building 80, like the communication system 10 illustrated in FIG. 4, communication can be performed from an area inside the building 80 where a wireless wave of the repeater 14 is not received (such as the underground of the building and inside a room with a thick wall (steel frame)).

Moreover, the power line 18 already wired inside the building 80 is used and thus, a communication signal can be transmitted without newly providing a line. Thus, by providing the repeater 14, the communication system 10 can cause a communication signal to reach a wider area. Also, the power line 18 can be used and therefore, a constitution of the communication system 10 can be applied to various objects having an outlet. By installing the repeater 14 in, for example, a vehicle such as an electric train or automobile, a user riding in the vehicle can transmit and receive a communication signal via an outlet. Thus, by performing communication via the fixed repeater 14, a mobile communication device can perform communication without searching and switching a base station for communication. The repeater 14 communicates with the base station 12 wirelessly, and the repeater 14 has a higher functionality of transmitting and receiving a communication signal than a mobile communication device. Thus, the repeater 14 improves the quality of the communication system 10 as a whole.

If a system is configured in such a way a power line passes with a substation or the like, it becomes necessary for power-line carrier communication to temporarily extract the communication signal for voltage transformation and then to superimpose the communication signal again. However, if a system configured in such a way a communication signal is transmitted and received with a repeater, a power line inside a building where the repeater is installed and the like, the power line does not generally pass with a substation and thus, a communication signal can be transmitted and received appropriately. While there is a certain limit of power-line carrier communication to the amount of signal that can be superimposed on a power line (the number of lines by which communication is performed), the power line can be used more effectively by making a conversion for each of the repeaters 14 and 16. That is, by performing power-line carrier communication for each of the repeaters 14, power-line carrier communication can be performed for each area centered on each of the repeaters 14. Accordingly, the same wavelength can be used for different areas and therefore, power-line carrier communication can be performed by the more number of lines.

The communication system 10 can connect the base station 12 and the mobile communication device 22 described above with four paths and therefore, with the increased choice, a more suitable communication state can be realized in a wider range.

By performing power-line carrier communication together with the repeater 16, the repeater 14 can select the communication method in accordance with intended use. Moreover, communication can be performed by using both wireless communication and power-line carrier communication and therefore, the amount of communication signal transmitted/received at a time can be increased.

Figure 5:
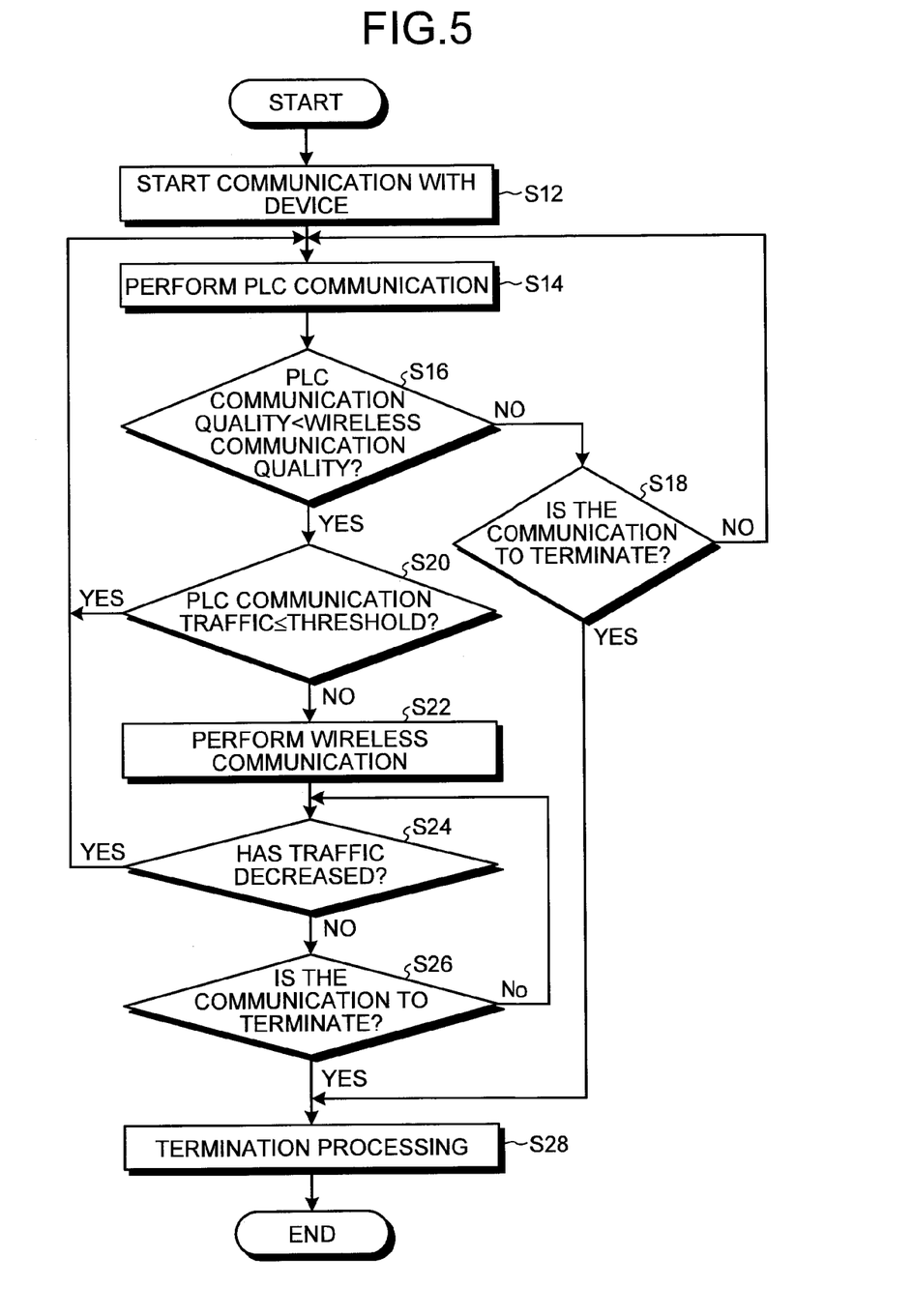
FIG. 5 is a flow chart illustrating the operation of the communication system.

The repeater 14 can communicate with the mobile communication device 22 through both the wireless communication 68 and the power-line carrier communication 62 and therefore, the repeater 14 can select the communication method to be used. Accordingly, the repeater 14 can communicate with the mobile communication device using a more appropriate communication method. An example of selecting the communication method by the repeater 14 will be described below using FIG. 5. FIG. 5 is a flow chart illustrating the operation of the communication system.

First, in step S12, the repeater 14 starts communication with the device (the mobile communication device 22). The repeater 14 starts communication with the mobile communication device 22 when the repeater 14 detects an incoming signal from another communication device to the mobile communication device 22, that is, transmission of a signal making a notification of voice communication, mail or the like from the base station 12. The repeater 14 also starts communication with the mobile communication device 22 when the repeater 14 detects an outgoing signal from the mobile communication device 22 to another communication device, that is, transmission of a signal making a notification of voice communication, mail or the like from the mobile communication device 22. The repeater 14 detects the mobile communication device 22 with which the repeater 14 can communicate at predetermined intervals. When communication is started, the repeater 14 starts communication with the pre-detected mobile communication device 22. By detecting the mobile communication device 22 with which the repeater 14 can communicate in advance, the repeater 14 can determine, when an incoming signal is received from another communication device via the base station 12, whether the mobile communication device to be communicated is the mobile communication device 22 with which the repeater 14 can communicate.

After starting communication in step S12, in step S14, the repeater 14 performs communication by the PLC method (power-line carrier communication). That is, the repeater 14 uses the PLC method as the communication method when the communication is started.

After setting the PLC method as the communication method in step S14, in step S16, the repeater 14 determines whether PLC communication quality<wireless communication quality holds. The PLC communication quality is quality of communication with power-line carrier communication, that is, quality of communication performed with the mobile communication device 22 with power-line carrier communication by using the modem 32 and the power transformer 34. The PLC communication quality can be determined by the communication quality detection unit 42 of the state determination unit 38. The wireless communication quality is quality of communication performed with the mobile communication device 22 with wireless communication by using the wireless communication unit 30. The wireless communication quality can be determined based on the state determination unit 38. The state determination unit 38 may determine quality by analyzing a communication signal used actually for communication (that is, a communication signal transmitted and received between the mobile communication device 22 and another communication device). The state determination unit 38 may determine quality by transmitting and receiving a communication signal created for quality determination on each path between the repeater 14 and the mobile communication device 22 and analyzing results thereof. The state determination unit 38 may also detect quality of two communication methods by performing communication of the two communication methods simultaneously or by temporarily switching to communication by the wireless method while performing communication by the PLC method.

If the repeater 14 determines in step S16 that PLC communication quality<wireless communication quality does not hold (No), that is, PLC communication quality≥wireless communication quality holds, in step S18, the repeater 14 determines whether to terminate the processing. That is, in step S18, the repeater 14 determines whether to terminate communication with the mobile communication device 22 with which communication is being performed. If the repeater 14 determines in step S18 that communication with the mobile communication device 22 should not be terminated (No), that is, communication with the mobile communication device 22 should be continued, the repeater 14 proceeds to step S14. If the repeater 14 determines in step S18 that communication with the mobile communication device 22 should be terminated (Yes), the repeater 14 proceeds to step S28. Thus, if PLC communication quality is maintained higher than wireless communication quality, the repeater 14 performs communication with the mobile communication device 22 with PLC communication until communication is terminated.

If the repeater 14 determines in step S16 that PLC communication quality<wireless communication quality holds (Yes), in step S20, the repeater 14 determines whether PLC communication traffic≤threshold holds, that is, PLC communication traffic is equal to the threshold or less. The PLC communication traffic can be determined by the traffic detection unit 44 of the state determination unit 38. If the repeater 14 determines in step S20 that PLC communication traffic≤threshold holds (Yes), the repeater 14 proceeds to step S14. That is, if the repeater 14 determines that the PLC communication traffic is equal to the threshold or less, the repeater 14 continues communication by the PLC method.

If the repeater 14 determines in step S20 that PLC communication traffic>threshold holds (No), in step S22, the repeater 14 performs communication by the wireless method. That is, if the repeater 14 determines that the PLC communication traffic is higher than the threshold (PLC communication lines are congested or the amount to be processed is large), the repeater 14 switches communication with the mobile communication device 22 from the PLC method to the wireless method.

After switching the communication method to the wireless method (wireless communication) in step S22, in step S24, the repeater 14 determines whether traffic has decreased. Various settings can be used as criteria for determining whether traffic has decreased. For example, traffic may be determined to have decreased if traffic becomes equal to the threshold used in step S20 or less or traffic may be determined to have decreased if traffic decreases by a fixed amount or more.

If the repeater 14 determines in step S24 that traffic has decreased (Yes), the repeater 14 proceeds to step S14 to repeat the above processing. Accordingly, when traffic has decreased by the fixed amount or more, the repeater 14 reselects the PLC method or the wireless method as the communication method.

If the repeater 14 determines in step S24 that traffic has not decreased (No), in step S26, the repeater 14 determines whether to terminate communication. If the repeater 14 determines in step S26 that communication with the mobile communication device 22 should not be terminated (No), that is, communication with the mobile communication device 22 should be continued, the repeater 14 proceeds to step S24. If the repeater 14 determines in step S26 that communication with the mobile communication device 22 should be terminated (Yes), the repeater 14 proceeds to step S28.

If the repeater 14 determines in step S18 or S26 that communication with the mobile communication device 22 should be terminated (Yes), in step S28, the repeater 14 performs termination processing, more specifically, processing to terminate communication with the mobile communication device 22. Then, the repeater 14 terminates the present processing.

Thus, by acquiring quality of PLC communication performed with the mobile communication device 22 and quality of wireless communication with the state determination unit 38 and selecting the communication method to be used based on the comparison result, the repeater 14 can perform communication in higher quality. That is, the repeater 14 can select the communication method which provides a better communication state.

As illustrated in FIG. 5, by making determinations based on traffic of PLC communication, the communication state can be determined without analyzing communication quality each time. Accordingly, the load of processing performed by the repeater 14 can be reduced.

In the above embodiment, the communication method to be used for communication is selected based on communication quality and traffic, but may be selected based on one of communication quality and traffic.

In the above embodiment, the communication method to be used for communication is selected based on communication quality and traffic, but the present invention is not limited to this. The repeater 14 can select the communication method with the mobile communication device 22 by various methods.

For example, the repeater 14 may be set to perform power-line carrier communication with only preset mobile communication devices (mobile communication devices having individual preset identification number). That is, the repeater 14 may communicate with unregistered mobile communication devices with only wireless communication, though these mobile communication devices are communicable with power-line carrier communication. Thus, by adopting a setting to enable only registered mobile communication devices to perform power-line carrier communication with the repeater 14, the power-line carrier communication can be made available to specific target users. Accordingly, for example, the power-line carrier communication can be made available to only persons involved in a building where the repeater 14 is installed so that the power-line carrier communication whose number of lines is limited can be used satisfactorily. Moreover, the repeater 14 converts only specific target communication into power-line carrier communication and thus, the load of information processing can be reduced.

It is preferable for the repeater 14 to set priorities to mobile communication devices so that mobile communication devices with higher priorities preferentially use power-line carrier communication. By making such priorities settable, power-line carrier communication can be used more effectively.

The repeater 14 in the above embodiment relays communication between the base station 12 and the mobile communication device 22, that is, communication signals transmitted between the mobile communication device 22 and other communication devices via the base station 12, but the present invention is not limited to this. In addition to the relay of communication signals between the base station 12 and other communication devices, the repeater 14 may relay communication signals that do not go with the base station 12. That is, the repeater 14 may relay communication signals transmitted between two mobile communication devices that can communicate with the same repeater 14. In other words, the repeater 14 may have a function as a base station of internal network within an area where the repeater 14 can communicate.

The repeater 14 may also transmit and receive communication signals from/to a mobile communication device that can communicate with the repeater 14 and a mobile communication device that can communicate with the other repeater 14 connected to power-line carrier communication without going through the base station 12. That is, a network, for example, a Virtual Private Network (VPN) may be formed by a plurality of the repeaters 14. In this case, the danger of wireless transmission being intercepted and information being acquired can be reduced by performing communication with power-line carrier communication.

In the above embodiment, the power converter 20 and the mobile communication device 22 are presented as separate devices, but the power converter 20 and the mobile communication device 22 may be integrated. The power converter 20 may have only the charging function mounted thereon to mount the modem function on the mobile communication device 22. Or, the power converter 20 may only have the function for transmitting and receiving communication signals without having the charging function.

A communication repeater according to the present invention achieves an effect of being able to enable communication with an area where communication cannot be performed with the outer area with wireless communication or quality of wireless communication deteriorates and to transmit and receive a communication signal to/from communication devices appropriately.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A communication repeater, comprising:
    a transmitting and receiving unit configured to transmit and receive a communication signal to/from a communication device with wireless communication;
    a modem unit for modulating and demodulating the communication signal to a power line;
    a power supply unit connected to a power line of a commercial power supply;
    a power-line carrier communication unit configured to transmit and receive a communication signal superimposed on a carrier transmitted over the power line from/to the communication device;
    a traffic detection unit configured to detect an amount of traffic of the power-line carrier communication; and
    a control unit configured to control wireless communication of the transmitting and receiving unit with the communication device and power-line carrier communication of the power-line carrier communication unit with the communication device, wherein
    the control unit, when the amount of traffic detected by the traffic detection unit exceeds a preset threshold, performs the wireless communication of the transmitting and receiving unit with the communication device.

2. The communication repeater according to claim 1, wherein the control unit is configured to perform the power-line carrier communication of the power-line carrier communication unit with the communication device having a preset identification number.

3. The communication repeater according to claim 1, further comprising:
    a communication quality detection unit configured to detect communication quality of the wireless communication of the transmitting and receiving unit and communication quality of the power-line carrier communication of the power-line carrier communication unit with the communication device, wherein
    the control unit is configured to perform communication with the communication device through either one of the wireless communication of the transmitting and receiving unit or the power-line carrier communication of the power-line carrier communication unit based on a detection result by the communication quality detection unit.

4. The communication repeater according to claim 3, wherein the control unit, when the communication quality of the power-line carrier communication is higher than the communication quality of the wireless communication, performs the power-line carrier communication of the power-line carrier communication unit.

5. The communication repeater according to claim 1, wherein the power-line carrier communication unit is further configured to perform power-line carrier communication with another communication repeater.

6. A communication system for transmitting and receiving a communication signal from/to a mobile communication device, comprising:
    a communication repeater configured to transmit and receive the communication signal from/to the mobile communication device with wireless communication; and
    a power converter configured to transmit and receive the communication signal from/to the communication repeater with power-line carrier communication and configured to transmit and receive the communication signal from/to the mobile communication device with power-line carrier communication, wherein
    the communication repeater further comprising:
        a controller; and
        a traffic detection unit configured to detect an amount of traffic of the power-line carrier communication,
        wherein when the amount of traffic detected by the traffic detection unit exceeds a preset threshold the controller performs the wireless communication of a transmitting and receiving unit with the mobile communication device.

7. The communication system according to claim 6, further comprising:
    a second power converter configured to transmit and receive the communication signal from/to the communication repeater with power-line carrier communication and configured to transmit and receive the communication signal from/to the mobile communication device with wireless communication.

* * * * *